Feb. 8, 1955
J. J. CARNEY
2,701,415
PINKING SHEARS
Filed July 8, 1950
2 Sheets-Sheet 1
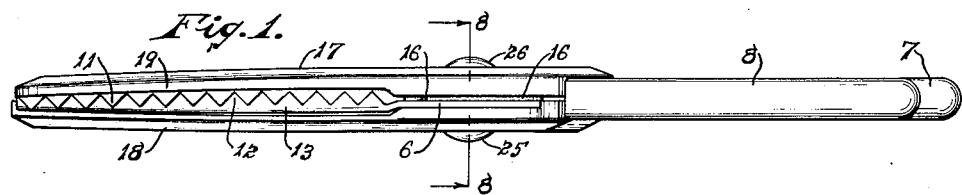
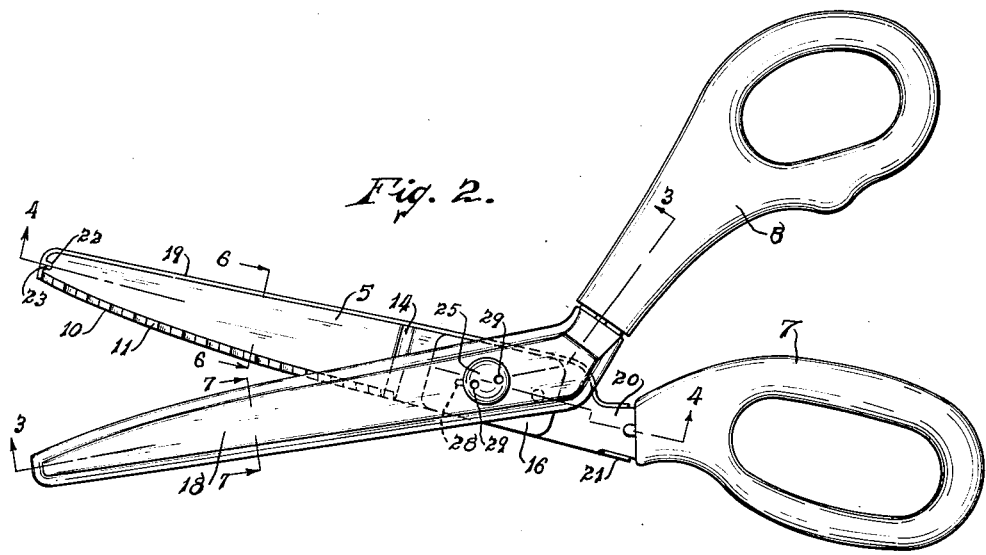
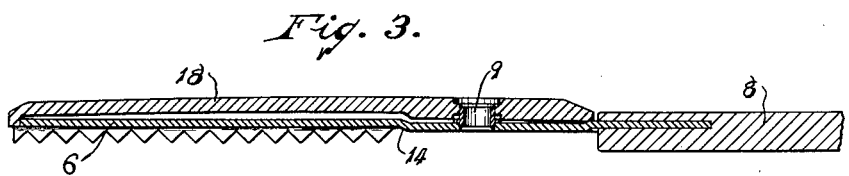
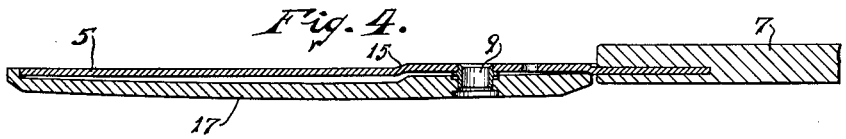
INVENTOR.
JAMES J. CARNEY
BY *Louis V. Lucia*
ATTORNEY.

Feb. 8, 1955
J. J. CARNEY
2,701,415
PINKING SHEARS
Filed July 8, 1950
2 Sheets-Sheet 2
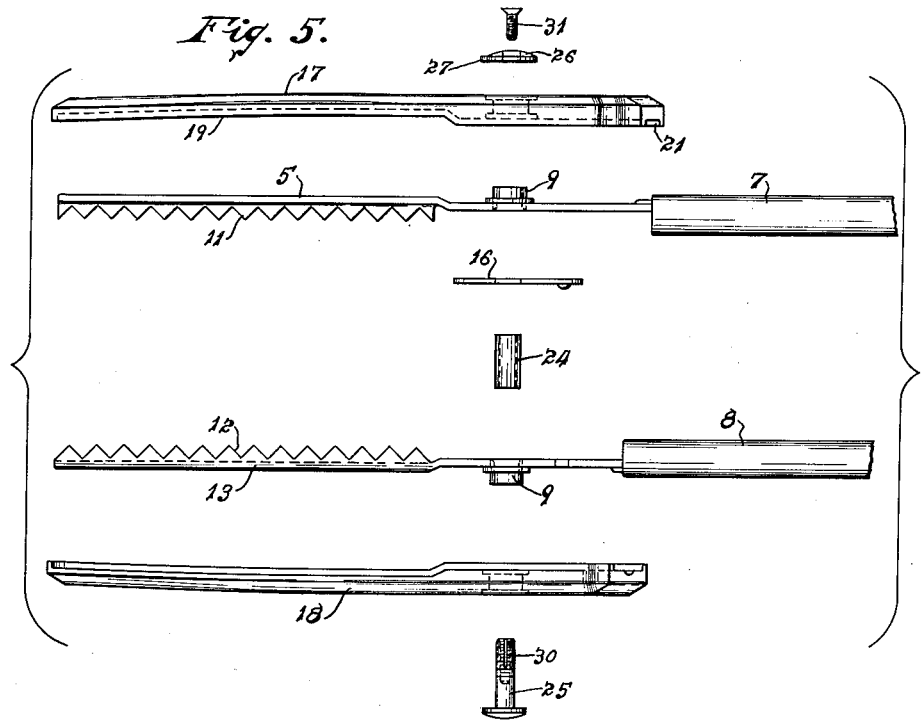
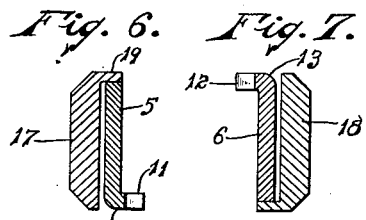
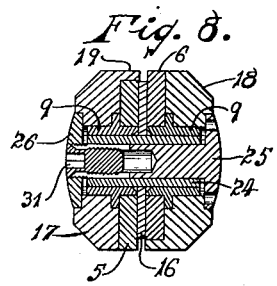
INVENTOR.
JAMES J. CARNEY
BY
*Louis V. Lucia*
ATTORNEY.

United States Patent Office 2,701,415
Patented Feb. 8, 1955

2,701,415

PINKING SHEARS

James J. Carney, Wethersfield, Conn., assignor to The United Tool & Die Company, Elmwood, Conn., a corporation of Connecticut Application July 8, 1950, Serial No. 172,751

1 Claim. (Cl. 30—230)

This invention relates to pinking shears and more particularly to pinking shears, or scissors such as are intended for cutting sheet material such as cloth, or the like, and providing along the cut edge thereof a "pinked" or staggered formation which is especially suited for preventing unraveling of said material.

An object of this invention is to provide a pair of shears of novel construction whereby it is rendered economical to manufacture, durable and highly efficient in its operation.

A further object of the present invention is to provide a pair of shears having novel means associated with the cutting blades thereof for causing proper contact between the cutting edges of said blades to greatly improve the operation of the shears.

Further objects and advantages of this invention will be more clearly understood from the following description and the accompanying drawings in which:

Fig. 1 is a plan view of a pinking shears embodying my present invention.

Fig. 2 is a side view of said shears.

Fig. 3 is a plan view, in central horizontal section, of one of the blades of said shears.

Fig. 4 is a similar view of the opposite blade.

Fig. 5 is an exploded plan view of the pinking shears assembly.

Fig. 6 is an enlarged sectional end view of one of the blades, on line 6—6 of Fig. 2.

Fig. 7 is a similar view of the opposite blade, on line 7—7 of Fig. 2.

Fig. 8 is an enlarged sectional end view, on line 8—8 of Fig. 1.

In the embodiment of the invention as illustrated in the drawing, my improved pinking shears comprises a pair of opposed blades 5 and 6 to which are attached, preferably by molding thereon, a pair of handles 7 and 8 respectively. Each of said blades is provided with a hub, in the form of a sleeve 9, which is secured to the blade by being brazed thereto or in any other suitable manner.

The blade 5 has a flange 10 extending perpindicularly along the edge of the blade and the said flange is cut to form a series of teeth 11 which provide a serrated cutting edge that meshes with a cooperating cutting edge that is provided by a series of teeth 12 in the flange 13 of the opposite blade 6 to produce a pinked edge on a sheet of material that is cut with the said shears.

It will be noted that the blades 5 and 6 are formed of stamped sheet metal, of suitable thickness, and that they are forced inwardly towards the central axis of the shears, as at 14 and 15, so that the inner surfaces of the said blades will contact with the opposite sides of a spacer plate 16 which is positioned between said blades.

The opposite blades 5 and 6 are respectively provided with a supporting cover 17 and 18 each of which is formed to receive its respective blade and preferably die cast. The cover 17, which receives the blade 5, has a flange 19 running along the upper edge thereof and overlying the edge of the blade, as clearly shown in Fig. 6. This flange follows the contour of the blade and terminates on the shank 20 of said blade adjacent to the handle 7, as clearly illustrated in Fig. 2. The said cover is also provided with a short flange 21 to abut the opposite side of the shank 20 and thereby aid in securing the cover 17 against movement relatively to the blade 5; the opposite end of the said blade being provided with a notch 22 which receives a projection 23 on the cover to secure the end of said cover to the blade for preventing relative movement between the cover and blade during the operation of the shears. The opposite blade 6 is secured to its respective cover 18 in the similar manner.

The blades 5 and 6 are pivotally connected by means of a pivoting sleeve 24 which extends through the bushings 9 of the said blades and through the separating plate 16, as clearly illustrated in Fig. 8. A fastening device, such as an adjusting screw 25, has a head and a shank that extends therefrom through the sleeve 24 and is threaded to a nut 26. The said nut has a projection 27 which fits within a notch 28 in the cover 17 to prevent relative rotation, and the said nut fits within a recess in the cover as clearly illustrated. The head of the screw 25 also fits within a corresponding recess in the cover 18 and is provided with a pair of spaced holes 29—29 to receive a suitable wrench for rotating the screw.

In the form illustrated, the shank of the screw 25 is preferably slit, as at 30, and has an internal locking screw 31 threaded thereto with a tapered head that engages a tapered recess in the end of the nut 26 to prevent relative rotation and loosening of the pivotal connection between the blades.

It will be noted, particularly from Figs. 3 and 4, that the covers 17 and 18 are curved inwardly towards the central axis of the shears, which axis is on a line extending longitudinally between the blades. The said covers, therefore, contact their respective blades 5 and 6 at points adjacent their ends and are spaced therefrom in the intermediate portions. When the shears are assembled, the blades 5 and 6 are supported by their covers in a manner that the intermediate portions thereof are permitted to yield, due to their inherent resiliency, and thus assure positive contact between the respective cutting edges of the opposite blades for the entire length thereof. Also, due to the inward curvature of the covers, the blades, which also possess a degree of inherent resiliency, are positioned so that their end portions will extend over the central axis of the shears and thereby provide an overlap between the opposite blades, such as illustrated in Fig. 1, to yieldingly apply the required tension between the respective cutting edges at the ends of the blades for a proper cutting operation.

It will be understood that, in the operation of my improved shears, the blades 5 and 6, being supported with only their ends resting against the covers 17 and 18, are permitted to yield by the inherent resiliency in the blades, while the end portions in the blades are also permitted to yield by the inherent resiliency in the covers and there is thus assured a positive cutting contact between the opposite cutting edges throughout the length of the blades.

From the above description, it will be understood that the relative disposition of the cutting edges of the opposite blades is controlled by the covers 17 and 18 therefor which permit yielding action of the blades in the intermediate portion thereof and provide a desired amount of overlap so that yielding pressure will be maintained between the cutting edges at the end portions of the blades by the inherent resiliency of the covers.

My above described invention provides an improved pinking scissors which have proven highly superior in the quality of cut that they produce, as compared to other well known pinking shears of high quality standards, and it is noted that this is due particularly to the manner in which the cutting blades are supported by their respective covers, as above described. It has also been found that the covers provided by my invention may also be used to support, with equal advantage, cutting blades of conventional shears having straight cutting edges.

I claim:

A pair of shears including a pair of opposed cutting blades, each of which is constructed of substantially resilient metal, a supporting cover secured against the outer side of each blade; the inner surface of each of said covers being longitudinally concave and engaging its respective blade only at points adjacent the opposite ends thereof whereby the intermediate section of each of said blades is spaced from the inner surface of its cover and is adapted to yield relatively thereto upon engagement with the opposite blade, and fastening means pivotally connecting the blades.

References Cited in the file of this patent

UNITED STATES PATENTS

| | | |
|---|---|---|
| 626,336 | Noble | June 6, 1899 |
| 1,181,871 | Graham | May 2, 1916 |
| 1,660,286 | Wilkes | Feb. 21, 1928 |
| 1,671,569 | Boyd | May 29, 1928 |
| 2,284,664 | Kissling | June 2, 1942 |
| 2,490,414 | Carney | Dec. 6, 1949 |
| 2,508,706 | Cohn | May 23, 1950 |
| 2,511,187 | Weidauer | June 13, 1950 |
| 2,564,251 | De Angelis et al. | Aug. 14, 1951 |
| 2,564,537 | Lincoln | Aug. 14, 1951 |
| 2,582,184 | Wheeler | Jan. 8, 1952 |

FOREIGN PATENTS

| | | |
|---|---|---|
| 185,575 | Germany | May 24, 1906 |
| 383,482 | Great Britain | Nov. 17, 1932 |